United States Patent
Maeda

(10) Patent No.: US 6,752,191 B2
(45) Date of Patent: Jun. 22, 2004

(54) SHEET-AFFIXING DEVICE AND SHEET-SUPPLYING DEVICE

(75) Inventor: Tsuyoshi Maeda, Tokyo (JP)

(73) Assignee: Lintec Corporation, Tokyo (JP)

( * ) Notice: Subject to any disclaimer, the term of this patent is extended or adjusted under 35 U.S.C. 154(b) by 0 days.

(21) Appl. No.: 10/633,541

(22) Filed: Aug. 5, 2003

(65) Prior Publication Data

US 2004/0065414 A1 Apr. 8, 2004

(30) Foreign Application Priority Data

Aug. 8, 2002 (JP) .................................... P2002-230887

(51) Int. Cl.$^7$ ............................................ B30B 15/00
(52) U.S. Cl. ....................... 156/581; 156/364; 156/579; 156/580
(58) Field of Search ................................ 156/362, 363, 156/364, 579, 580, 581, 583.1

(56) References Cited

U.S. PATENT DOCUMENTS

| | | | | |
|---|---|---|---|---|
| 4,170,095 A | * | 10/1979 | Hightower | ...................... 53/75 |
| 5,232,539 A | * | 8/1993 | Carpenter et al. | ........... 156/360 |
| 5,624,525 A | * | 4/1997 | Ehara et al. | ................. 156/360 |

FOREIGN PATENT DOCUMENTS

| | | |
|---|---|---|
| JP | 7040434 | 2/1995 |
| JP | 7323953 | 12/1995 |

OTHER PUBLICATIONS

English Language Abstract of JP Appln. No. 7–040434.
English Language Abstract of JP Appln. No. 7–323953.

* cited by examiner

*Primary Examiner*—James Sells
(74) *Attorney, Agent, or Firm*—Greenblum & Bernstein, P.L.C.

(57) ABSTRACT

A sheet-affixing device for affixing a pressure sensitive adhesive-sheet onto a wheel is provided. The sheet-affixing device comprises an absorption plate member, an alignment shaft member, and a pressing member. The absorption plate member is formed in a ring-shape. The exterior diameter of the absorption plate member is smaller than the diameter of a rim. On the bottom surface of the absorption plate member there are provided a plurality of suction perforations. The alignment shaft member is fitted into the hub so that the center of the absorption plate member and the center of the wheel are aligned. The pressing member is used for pressing a peripheral part of the pressure sensitive adhesive-sheet against the rim so that the peripheral part is affixed to the rim. Further, the pressing member is movable relative to the absorption plate member along the axial direction of the ring-shaped absorption plate member.

8 Claims, 10 Drawing Sheets

SHEET-AFFIXING DEVICE AND SHEET-SUPPLYING DEVICE

BACKGROUND OF THE INVENTION

1. Field of the Invention

The present invention relates to a sheet-affixing device that is used for affixing a pressure sensitive adhesive-sheet, such as a protective film, onto a surface of an automobile wheel. Further, the present invention relates to a sheet-supplying device that supplies sheets to the above sheet-affixing device.

2. Description of the Related Art

A wheel for a vehicle, such as an aluminum wheel for an automobile, is shipped after affixing a protective film on its surface, so that the wheel surface is protected from flaw or soil. A pressure sensitive adhesive sheet for a protective film is made from a polypropylene or polyethylene film, of which thickness is about 20 $\mu$m to 100 $\mu$m. One side of the pressure sensitive adhesive sheet is provided with an adhesive layer of about 10 $\mu$m to 30 $\mu$m thickness, which comprises acrylic or rubber pressure-sensitive adhesive. The adhesive layer is initially covered with a release sheet and protected. The release sheet is peeled off before applying the protective film to an adherend. Since pressure sensitive adhesive sheets are extremely thin, they can not retain their shape by themselves, so that distortion and wrinkles can easily be produced in affixing operations of a pressure sensitive adhesive sheet. Therefore, there is a great difficulty in carrying out the sheet-affixing operations by an automaton, so that in most cases, skilled workers still manually carry out the above sheet-affixing operations. However, in recent years, there have been some attempts to provide an automaton for affixing pressure sensitive adhesive sheet to a wheel. For example, such a system is disclosed in Japanese Laid-open patent publications (KOKAI) Nos. 7-323953 and 7-40434.

The system disclosed in the above Japanese Laid-Open patent publications Nos. 7-323953 and 7-40434 are large and expensive systems comprising a conveying system, and are exclusively optimized for a certain type of workpiece, so that the devices are only adecuate when affixing pressure sensitive adhesive sheets to mass produced products of the same type. It is difficult to use the above systems for applications that include wheels having various configurations and sizes in the same line, because the above systems require alterations of the line when the shape or size of a wheel manufactured in the line is changed. This leads increases in expense and down time. Therefore, when wheels with different sizes or shapes are required to be dealt with in a line, the sheet-affixing operations still rely upon manual operation by skilled workers.

SUMMARY OF THE INVENTION

Therefore, an object of the present invention is to provide a compact sheet-affixing device used in sheet-affixing operations that can easily and efficiently affix a pressure sensitive adhesive sheet to a wheel, and which can be provided at a low cost. Further, the present invention aims to provide a sheet-supplying device that supplies a sheet to the above sheet-affixing device.

According to the present invention, a sheet-affixing device for affixing a pressure sensitive adhesive-sheet onto a wheel is provided. The sheet-affixing device comprises an absorption plate member, an alignment shaft member, and a pressing member.

The absorption plate member is formed in a ring-shape and its exterior diameter is smaller than the diameter of a rim of a wheel. On the bottom surface of the absorption plate member there is a plurality of suction perforations. The alignment shaft member is fitted into the hub of the wheel in order to align the center of the absorption plate member with the center of the wheel. The pressing member is used for pressing a peripheral part of the pressure sensitive adhesive-sheet, suctioned to the bottom surface of the absorption plate member, against the rim. Thereby the peripheral part is affixed to the rim. Further, the pressing member is movable relative to the absorption plate member along the axial direction of the ring-shaped absorption plate member.

Further, according to the present invention, a sheet-supplying device which supplies a pressure sensitive adhesive-sheet to the above-described sheet-affixing device is provided. The sheet-supplying device comprises a table member, a table elevator, a shaft receiving member, and a control unit.

A plurality of ring-shaped pressure sensitive adhesive-sheets is piled up on the table member. The table elevator transfers the table member along the axis of, the ring-shaped pressure sensitive adhesive-sheets. The shaft receiving member receives an alignment shaft member of the sheet-affixing device so as to align the center of the sheet-affixing device to the center of the ring-shaped pressure sensitive adhesive-sheets which are piled up on the table member. The control unit controls the table elevator in order to keep a position of the uppermost sheet of the pressure sensitive adhesive-sheets, piled up on the table member, at a predetermined position where the upper most sheet comes into contact with a bottom surface of the absorption plate member of the sheet-affixing device when the alignment of the sheet-affixing device is achieved.

BRIEF DESCRIPTION OF THE DRAWINGS

The objects and advantages of the present invention will be better understood from the following description, with reference to the accompanying drawings in which.

DESCRIPTION OF THE PREFERRED EMBODIMENTS

Figure 1:
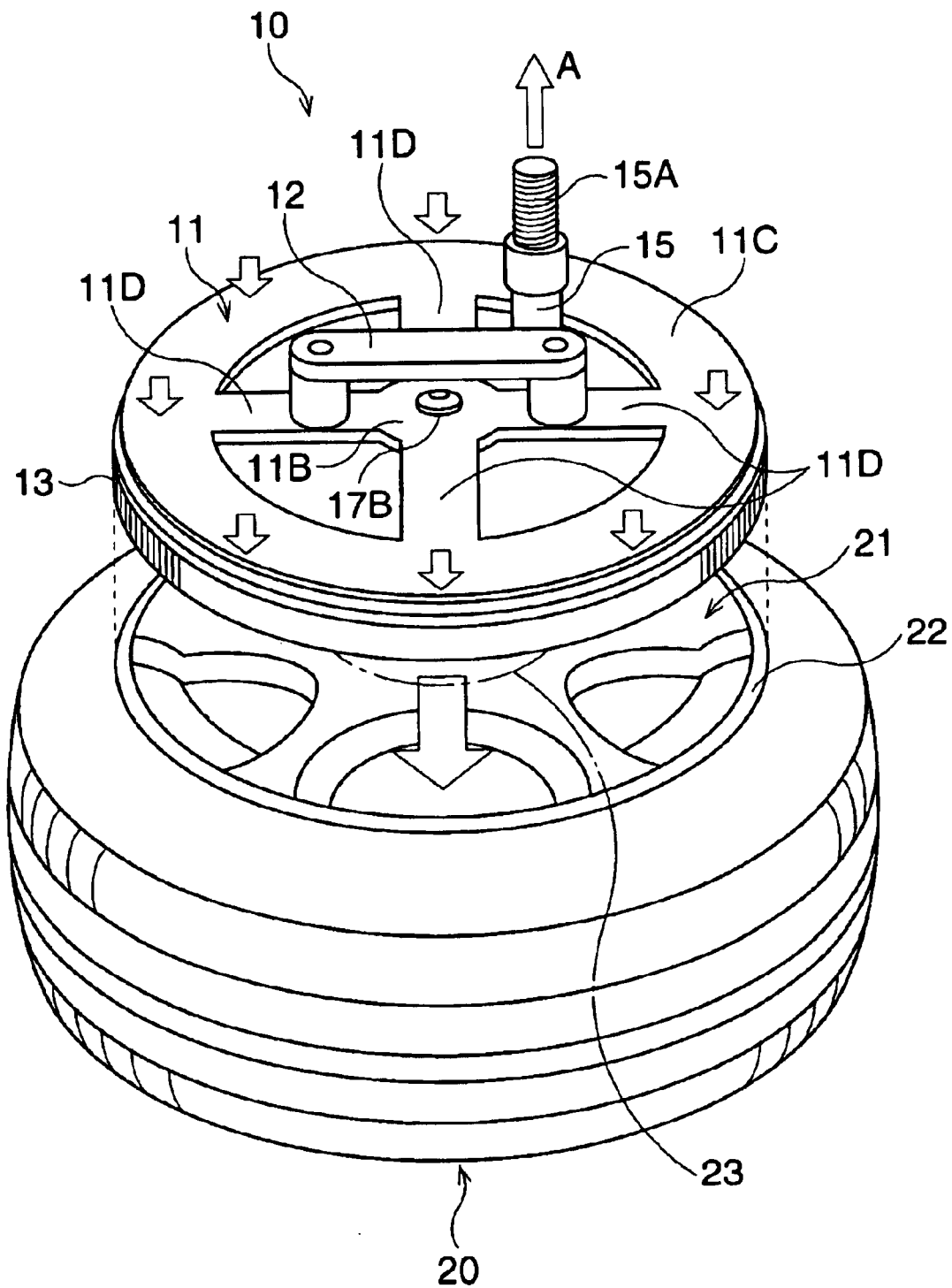
FIG. 1 is a perspective view of a sheet-affixing device of the first embodiment of the present invention.

The present invention is described below with reference to the embodiments shown in the drawings.

Figure 2:
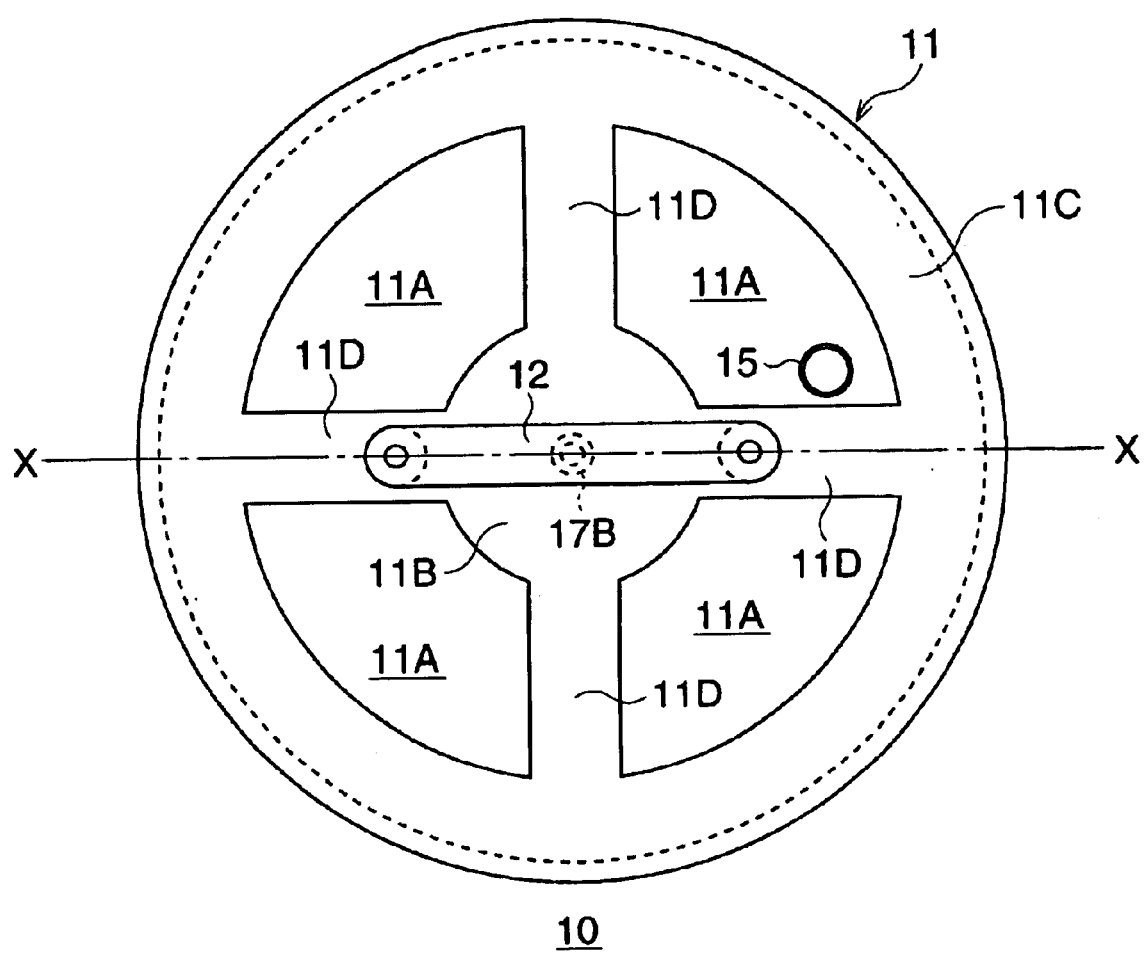
FIG. 2 is a top plan view of the sheet-affixing device illustrated in FIG. 1.
Figure 3:
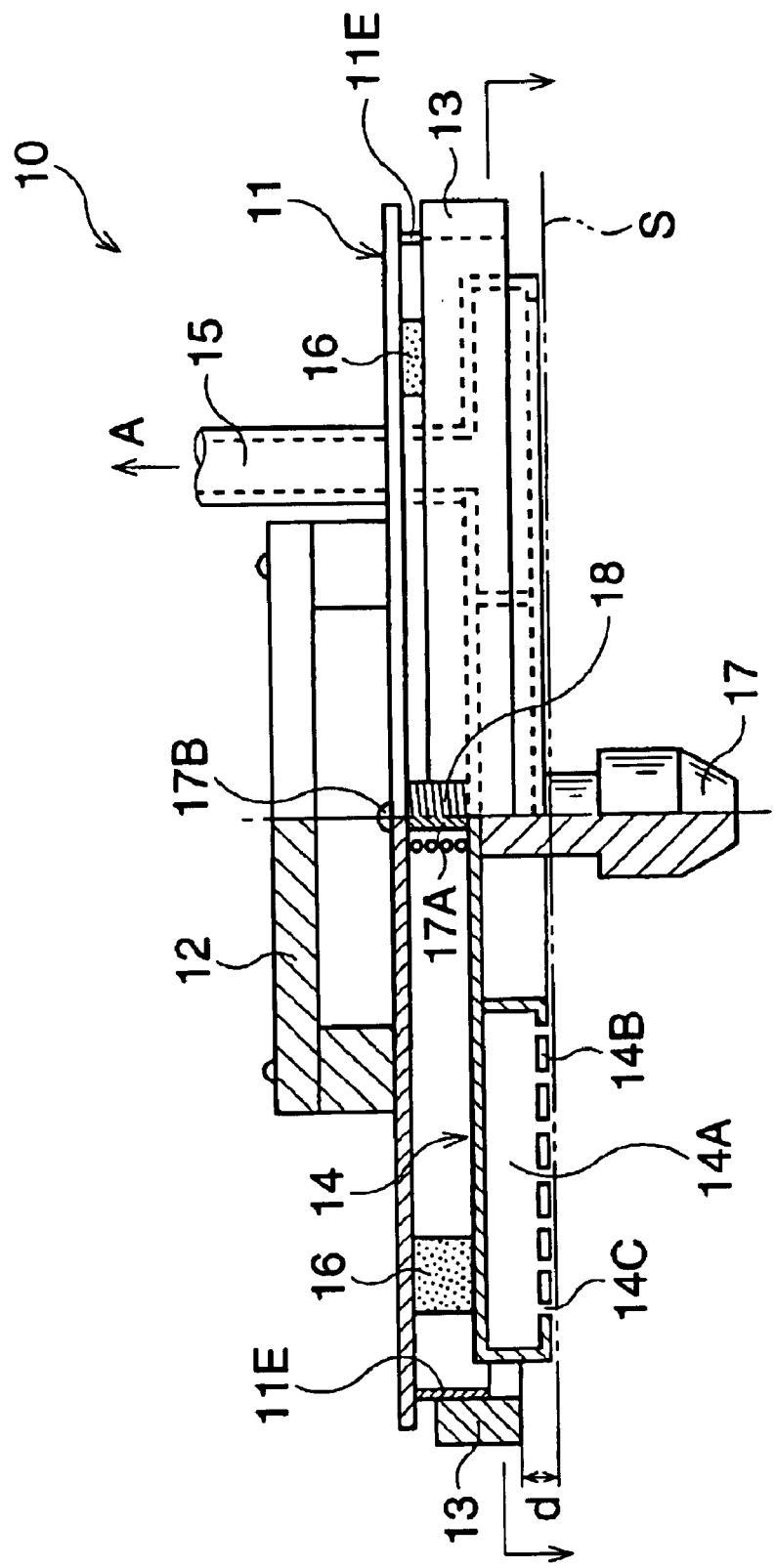
FIG. 3 is a side elevational view of the sheet-affixing device illustrated in FIG. 1.
Figure 4:
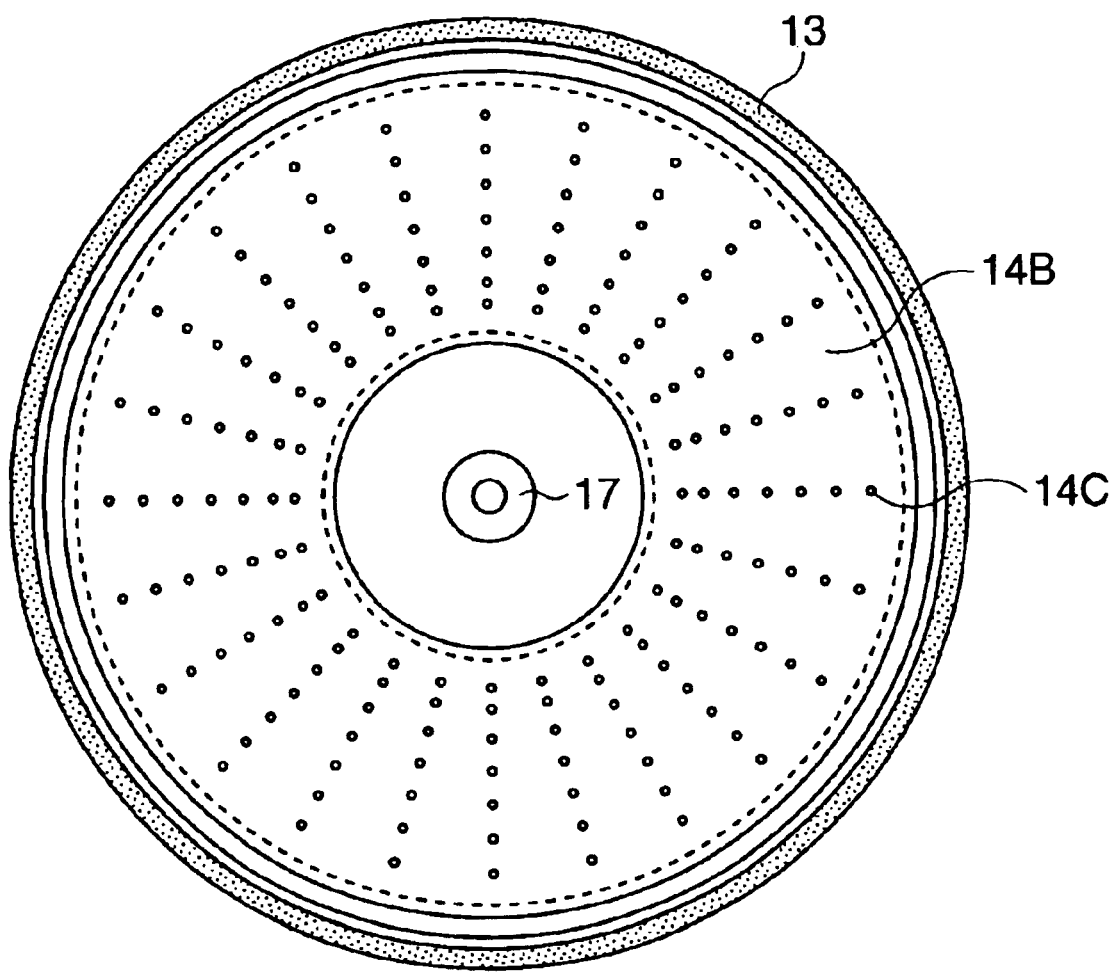
FIG. 4 is a bottom view of the sheet-affixing device illustrated in FIG. 1.

FIG. 1 is a perspective view of a sheet-affixing device for a wheel of a first embodiment of the present invention. FIGS. 2, 3 and 4 are a top plan view, a side elevational view, and a bottom view of the sheet-affixing device of FIG. 1, respectively. With reference to FIG. 1 through FIG. 4, the sheet-affixing device of the first embodiment will be described. Note that, the left half part of FIG. 3 indicates the cross sectional view along line X—X of FIG. 2.

A sheet-affixing device 10 comprises a cover member 11 which is provided with four fan-shaped openings 11A, for example, and they are arranged rotationally and symmetrically along the circumference of the cover member 11. Namely, the cover member 11 comprises a circular central section 11B, a ring-shaped outer peripheral section 11C, and four coupling sections 11D. The four coupling sections 11D define both sides of the four fan-shaped openings 11A and connects the central portion 11B and the outer peripheral section 11C. Further, the four coupling sections 11D are arranged so as to intersect crosswise at the center of the cover member 11. Furthermore, a handle member 12 is attached to a pair of coupling sections 11D that are arranged across the center of the cover member 11.

Beneath the outer peripheral section 11C, a sidewall 11E is cylindrically formed along the circumference of the outer peripheral section 11C. On the outer surface of the sidewall 11E, a pressing cushion 13 having a predetermined width and height is attached along the rim (e.g. along the entire circumference). Namely, the pressing cushion 13 is cylindrically arranged beneath the outer circumferential edge of the outer peripheral section 11C. As will be described in detail later, the pressing cushion 13 is used in order to press a pressure sensitive adhesive-sheet S onto the rim 22 of a wheel 21 that is installed in a tire 20 so as to attach the sheet S to the rim 22. Therefore, the diameter and width of the pressing cushion 13 are substantially equal to those of the rim 22. Further, the pressing cushion 13 may be made from material that has appropriate flexibility or elasticity, such as a urethane rubber or the like. Note that, the diameter of the pressure sensitive adhesive-sheet (a protective film) S is equal to or larger than the diameter of the pressing cushion 13, as shown in FIG. 3.

A predetermined distance below the cover member 11, and inside the area surrounded by the pressing cushion 13, there is an absorption plate 14 which is provided with an air chamber 14A. The air chamber 14A is a ring-shaped member with its center positioned at the center of the cover member 11. Further, the bottom surface 14B of the absorption plate 14 extends downwardly from the bottom end face of the pressing cushion 13 by the distance "d". A number of suction perforations 14C that penetrate the bottom surface 14B into the inside of the air chamber 14A are provided.

As shown in FIG. 4, the suction perforations 14C are aligned regularly on lines which are uniformly and radially arranged. Further, on the upper surface of the absorption plate 14, an air suction duct 15 is provided, and an air suction conduit 15A is attached thereto. Namely, the air inside the air chamber 14 is suctioned through the air suction duct 15 in a direction represented by an arrow "A". Thereby, the air is suctioned through the suction perforations 14C to the air chamber 14A, so that a pressure sensitive adhesive-sheet S is absorbed onto the bottom surface 14B of the absorption plate 14. Note that, the air suction duct 15 projects out to the upper surface of the cover member 11 through one of the four fan-shaped openings 11A which are formed on the cover member 11, and is connected to an air suction system (not shown), such as a ring compressor or the like, via the air suction conduit 15A.

On the upper surface of the ring-shaped air absorption plate 14, a ring-shaped cushion 16 is provided along the circumference of the air absorption plate 14. The cushion 16 is made of a flexible material or elastic material, such as a sponge rubber or the like. The bottom surface of the cushion 16 contacts with the upper surface of the air absorption plate 14 and the upper surface of the cushion 16 contacts with the bottom surface of the outer peripheral section 11C of the cover member 11. The entire configuration of the upper surface of the air absorption plate 14 is substantially formed into a disk shape, and its center is fixedly supported by the upper end face of an alignment shaft member 17.

For example, the bottom end portion of the alignment shaft member 17 is formed into a truncated cone shape, so that the bottom end is inserted into the hub 23 of the wheel 21 so as to align the sheet-affixing device 10 with the wheel 21. At the center of the upper end face of the alignment shaft member 17, where the absorption plate 14 is attached, a supporting member 17A that is formed as a bar member is attached and extends coaxially along the axis of the alignment shaft member 17, and penetrates the central section 11B of the cover member 11. Further, on the end of the supporting member 17A, which has penetrated the central section 11B, a nut 17B, for example, is attached. Between the alignment shaft member 17 and the central section 11B of the cover member 11, an elastic member, such as a coil spring 18 or the like, is installed. The coil spring 18 biases the cover member 11 so as to separate the cover member 11 from the absorption plate 14 and the alignment shaft member 17 (upward direction in FIG. 3). On the other hand, the upward motion of the cover member 11 is restricted by the nut 17B, thereby a certain predetermined distance is maintained between the cover member 11 and the absorption plate 14 and the alignment shaft member 17 when no external force is acting on the sheet-affixing device 10.

Next, sheet-affixing operations for applying a sheet to a wheel by using the sheet-affixing device 10 of the present embodiment are explained. Note that, the following description is made under the conditions that a pressure sensitive adhesive-sheet S has already been absorbed and held on the absorption plate 14 and further the adhesive layer of the sheet S has already been exposed.

The bottom end portion of the alignment shaft member 17 is inserted into the hub 23 of the wheel 21 as the sheet-affixing device 10 approaches the wheel 21, from the position indicated in FIG. 1, by manipulation of an operator supporting the handle 12, so that the alignment of the sheet-affixing device 10 with the wheel 21 is determined. When the sheet-affixing device 10 further approaches the wheel 21, the bottom surface 14B of the absorption plate 14 contacts with the wheel 21. Namely, the bottom surface 14B at first contacts with a swelling portion of the wheel 21, which is provided between the rim 22 and the hub 23, in general. At this time, the pressure sensitive adhesive-sheet S which has been absorbed on the bottom surface 14B of the absorption plate 14, is sandwiched between the swelling portion of the wheel 21 and the bottom surface 14B, and the pressure sensitive adhesive layer is pressed against the swelling portion, so that the pressure sensitive adhesive-sheet S is adhered to the swelling portion of the wheel 21. Note that, at this moment, the pressing cushion 13 has not come into contact with the rim 22. Namely, the distance "d" is preset to a distance that is sufficient for the pressing cushion 13 not to come into contact with the rim 22 even when the bottom surface 14B has already been in contact with the wheel 21.

When the operator further depresses the sheet-affixing device 10 toward the wheel 21, the coil spring 18 and the cushion 16 are compressed, so that the cover member 11 and the pressing cushion 13 attached thereto, is depressed. At this time, the pressing cushion 13 comes in contact with the rim 22, so that the peripheral part of the pressure sensitive adhesive-sheet S is sandwiched between the rim 22 and the pressing cushion 13, thereby the pressure sensitive adhesive layer of the pressure sensitive adhesive-sheet S is pressed against the rim 22 and the peripheral portion of the pressure sensitive adhesive-sheet S adheres to the rim 22. When the sheet-affixing device 10 is lifted, the pressure sensitive adhesive-sheet S which has been absorbed on the bottom surface 14B of the absorption plate 14, is peeled off from the bottom surface 14B since the pressure sensitive adhesive-sheet S has already been affixed to the wheel 21.

As described above, the affixing operations using the sheet-affixing device 10 of the present embodiment are completed. Note that, the air suction from the air suction duct 15 may be paused for a while in order to peel off the pressure sensitive adhesive-sheet S from the bottom surface 14B of the absorption plate 14.

Figure 5:
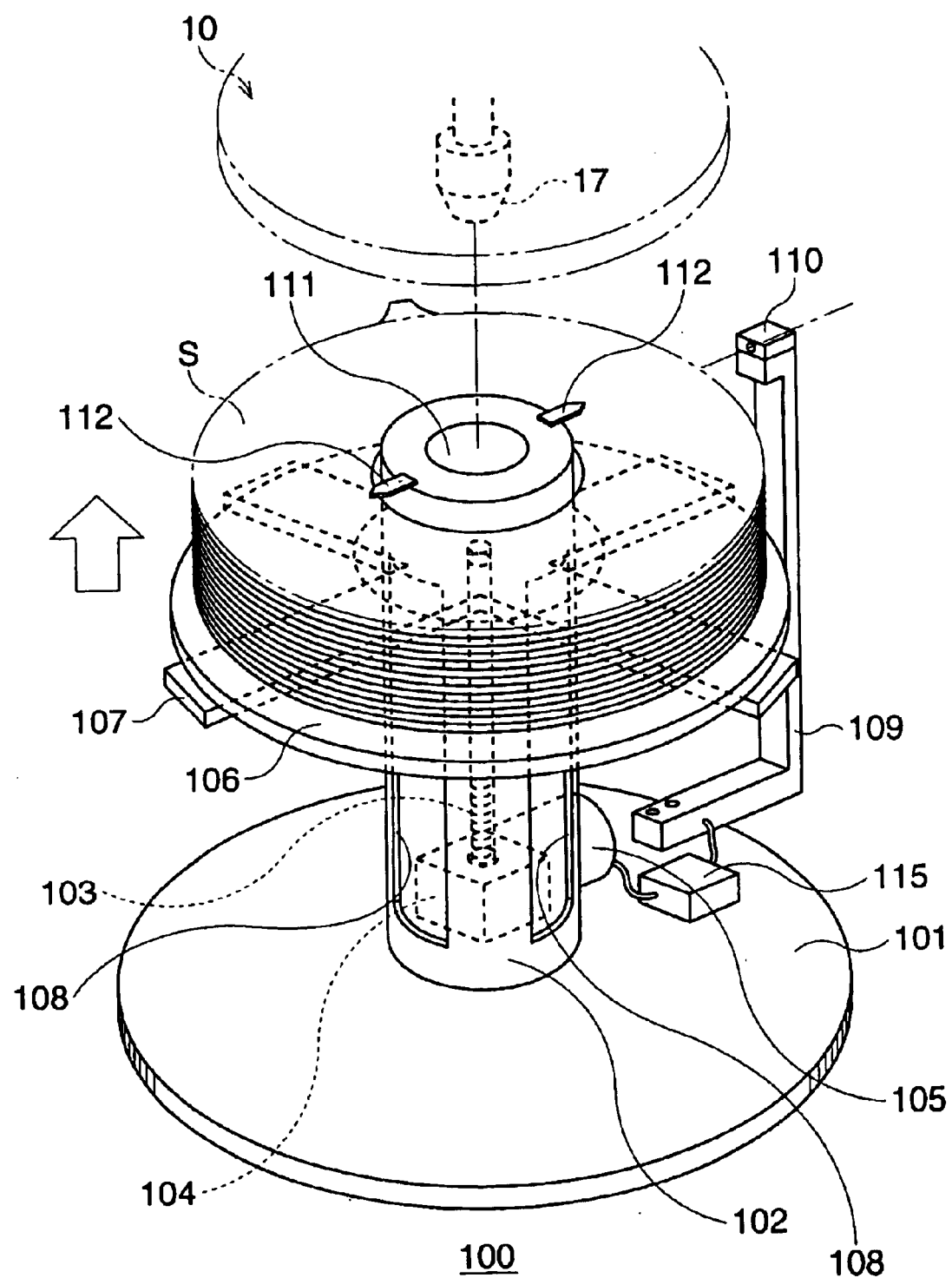
FIG. 5 is a perspective view of a sheet-supplying device which is used in the first embodiment.

FIG. 5 is a perspective view of a sheet-supplying device which stores a large number of pressure-sensitive adhesive-sheets and which supplies pressure sensitive adhesive-sheets in turn to the sheet-affixing device 10 of the present embodiment.

The entire part of a sheet-supplying device 100 is supported by a base member 101. A cylindrical supporting member 102 is provided at the center of the base member 101. Inside the cylindrical supporting member 102, a ball screw 103 that coaxially extends along the axis of the cylindrical supporting member 102 is provided. The bottom end of the ball screw 103 is connected to a driving motor 105, such as a stepping motor, via a power transmission 104, so that the ball screw 103 is rotated about the axis. Each of ring-shaped pressure sensitive adhesive-sheets S comprises laminating layers which include a base sheet, an adhesive layer, and a release sheet, in this order and are piled on a ring table 106 with each of the base sheets facing upward. The ring table 106 is supported by a cruciform supporting member 107, for example. The center of the cruciform supporting member 107 is engaged with the ball screw. On the sidewall of the cylindrical supporting member 102, four openings 108, along the axis of the cylindrical supporting member 102, are formed at regular intervals along the circumference, so that the four radially extending arms of the cruciform supporting member 107 extend out from the inside of the cylindrical supporting member 102 to the outside through these four openings 108. Namely, when the ball screw 103 is rotated by the driving motor 105, the cruciform supporting member 107 can be translated upward or downward along the axis of the ball screw 103 while rotation of the cruciform supporting member 107 is restricted by the openings 108.

Further, a sensor-supporting member 109 is provided to the base member 101. The sensor-supporting member 109 is fixed to the base member 101 and arranged substantially parallel to the axis of the cylindrical supporting member 102. On the upper end of sensor-supporting member 109, a sensor 110 that is able to detect the position of the top sheet among the pressure sensitive adhesive-sheets S piled on the ring table 106 is provided. An example of the sensor 110 is an optical sensor that comprises a light receiving device and light emitting device pair and which is disposed at the height where a pressure sensitive adhesive-sheet S should be absorbed onto the absorption plate 14 of the sheet-affixing device 10. Namely, a control unit 115 of the sheet-supplying device 100 controls the driving motor 105 in accordance with signals from the sensor 110, so that the top of the uppermost pressure sensitive adhesive-sheet of the pressure sensitive adhesive-sheets S which are piled on the ring table 106 is always kept at a predetermined position. For example, the sensor 110 detects a distance to an object positioned in front of the sensor by receiving the emitted light reflected from the object, thereby determining the position of the top sheet.

The alignment shaft member 17 of the sheet-affixing device 10 is fitted into the inside of the cylindrical supporting member 102 through the opening 111 formed on the upper end face of the cylindrical supporting member 102, so as to establish the alignment of the sheet-affixing device 10 with the sheet-supplying device 100. Further, at this time, the bottom surface 14B of the absorption plate 14 contacts with the uppermost pressure sensitive adhesive-sheet S, and the sheet is absorbed and attached thereto. When the sheet-affixing device 10 is lifted, only the uppermost pressure sensitive adhesive-sheet S is absorbed onto the bottom surface 14B and thus supplied to the sheet-affixing device 10. Note that, on the upper end of the cylindrical supporting member 102, a pair of film pieces 112 is symmetrically provided with respect to the cylindrical axis, for example. The film pieces have flexibility and prevent the absorption of two or more pressure sensitive adhesive-sheets S by the absorption plate 14. The operator peels off the release sheet from the pressure sensitive adhesive-sheet S and bares the adhesive layer of the sheet S after attaching the pressure sensitive adhesive-sheet S to the absorption plate 14.

As described above, according to the first embodiment of the present invention, an operator can peel off a release sheet when a pressure sensitive adhesive-sheet is attached on the absorption plate. Further, the pressure sensitive adhesive-sheet, of which the release sheet has been peeled off, is securely attached on the absorption plate and the alignment of the sheet-affixing device can be easily achieved by fitting the alignment shaft member into a hub, so that the pressure sensitive adhesive-sheet can be easily affixed onto a wheel at the proper position without making any distortion or wrinkle even if an inexperienced operator carries out the affixing operations. Further, a pressure sensitive adhesive-sheet is securely affixed onto a wheel, since a pressing cushion presses the sheet to a rim.

Further, the sheet-affixing device of the first embodiment can be used cooperatively with the sheet-supplying device, so that a pressure sensitive adhesive-sheet can be easily attached to the sheet-affixing device. Furthermore, the sheet-supplying device constantly and automatically provides a pressure sensitive adhesive-sheet at the appropriate position, so that the affixing operations can be carried out efficiently.

Next, with reference to FIG. 6 through FIG. 9, the second embodiment of a sheet-affixing device for an automobile wheel for which the present invention is applied is described.

Figure 6:
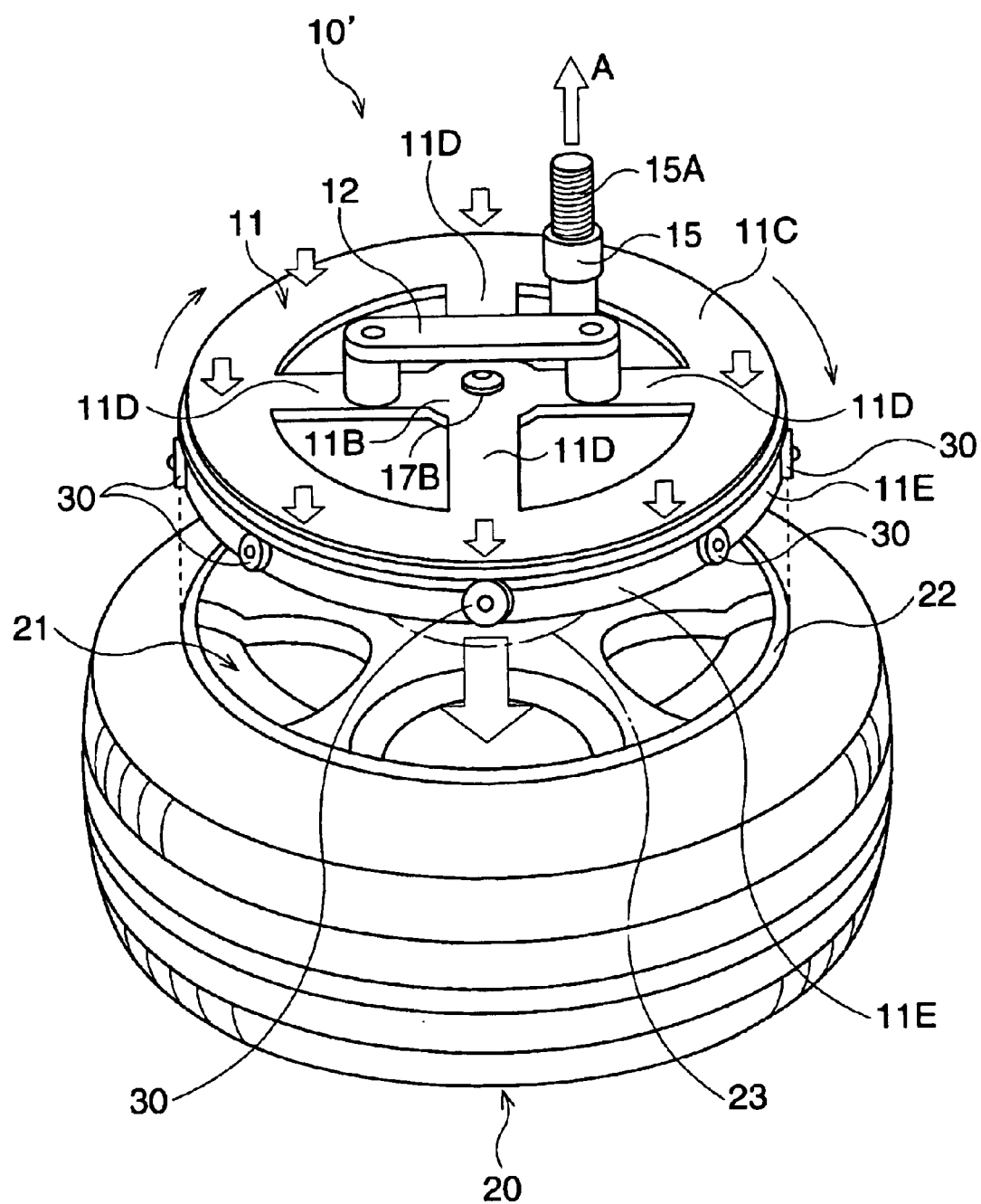
FIG. 6 is a perspective view of a sheet-affixing device of the second embodiment.
Figure 7:
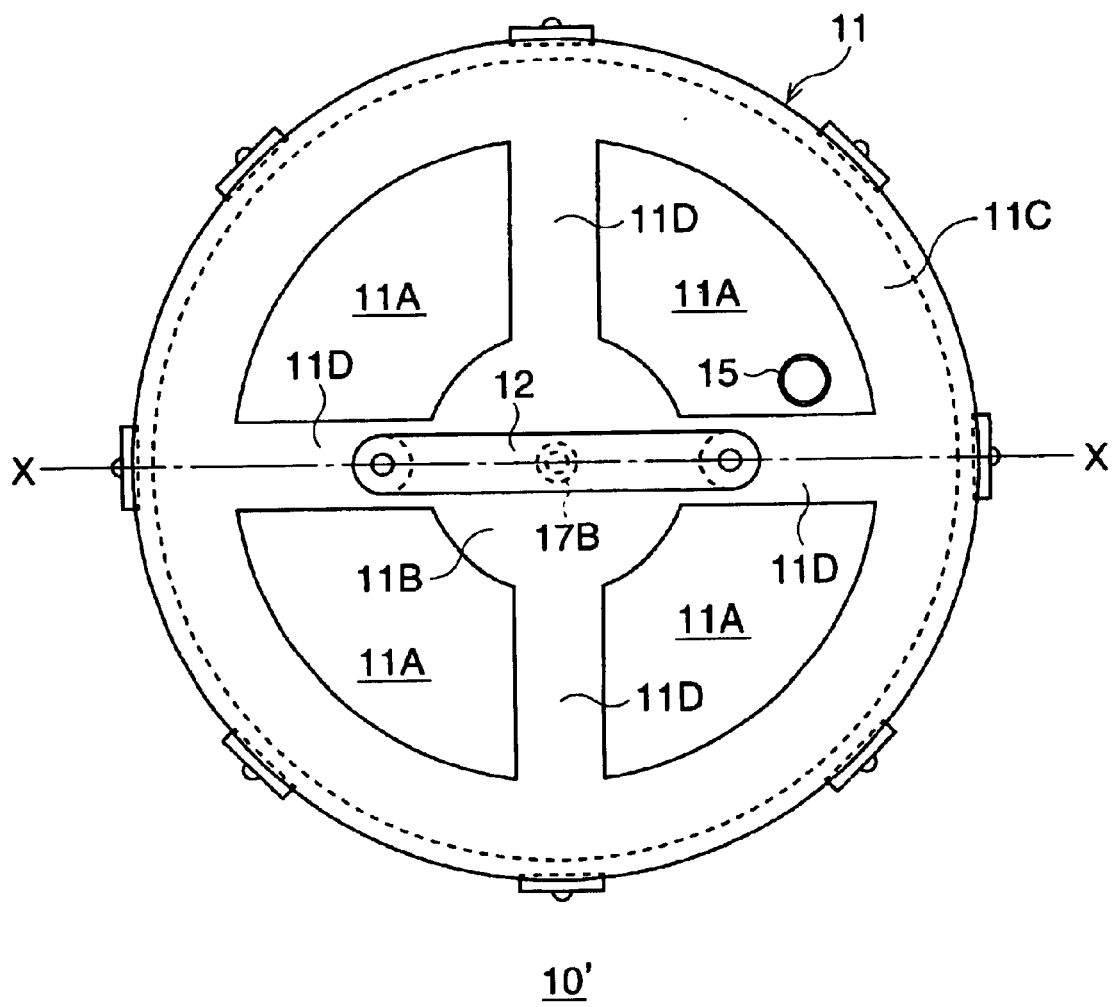
FIG. 7 is a top plan view of the sheet-affixing device illustrated in FIG. 6.
Figure 8:
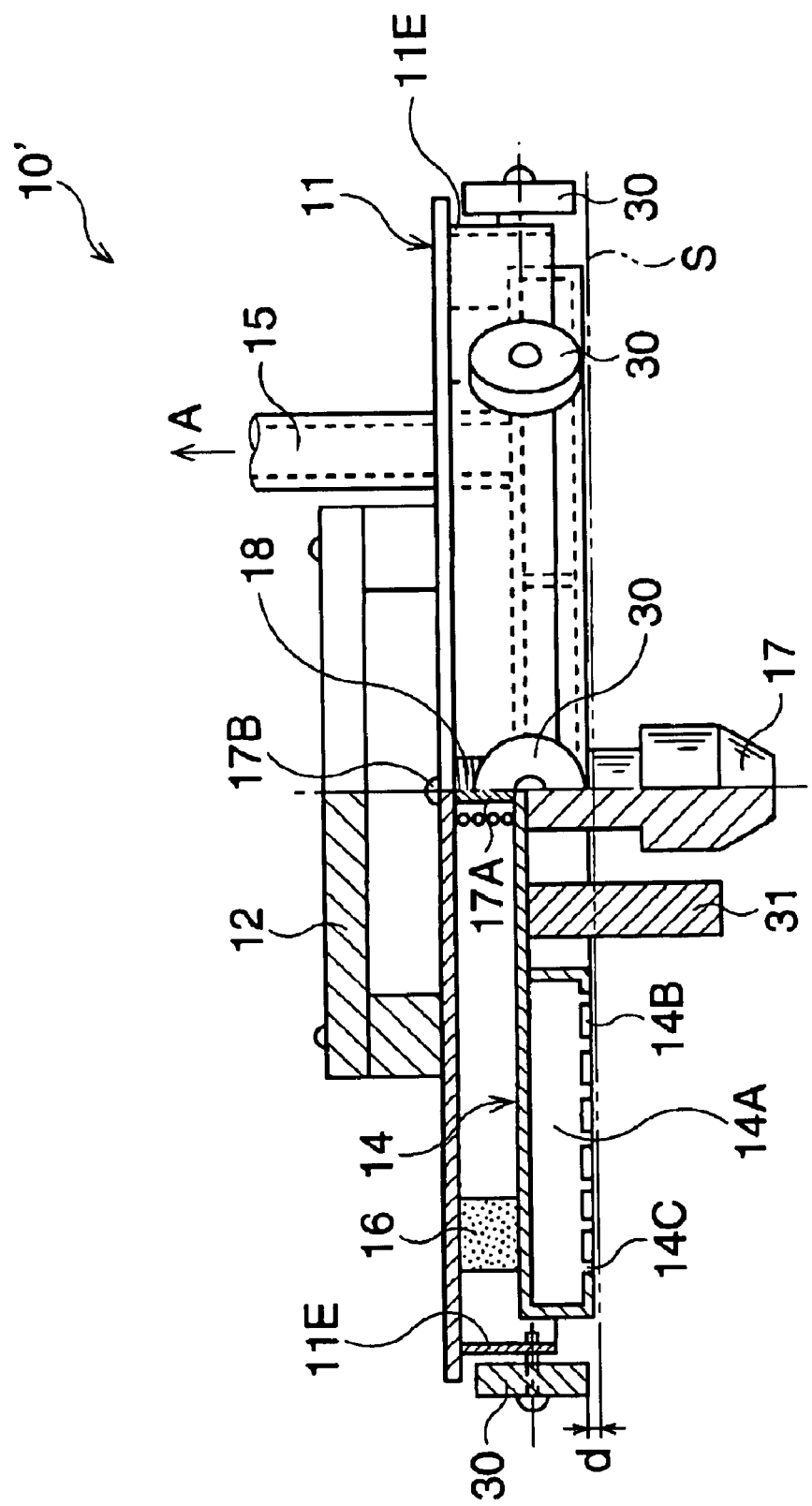
FIG. 8 is a side elevational view of the sheet-affixing device illustrated in FIG. 6.
Figure 9:
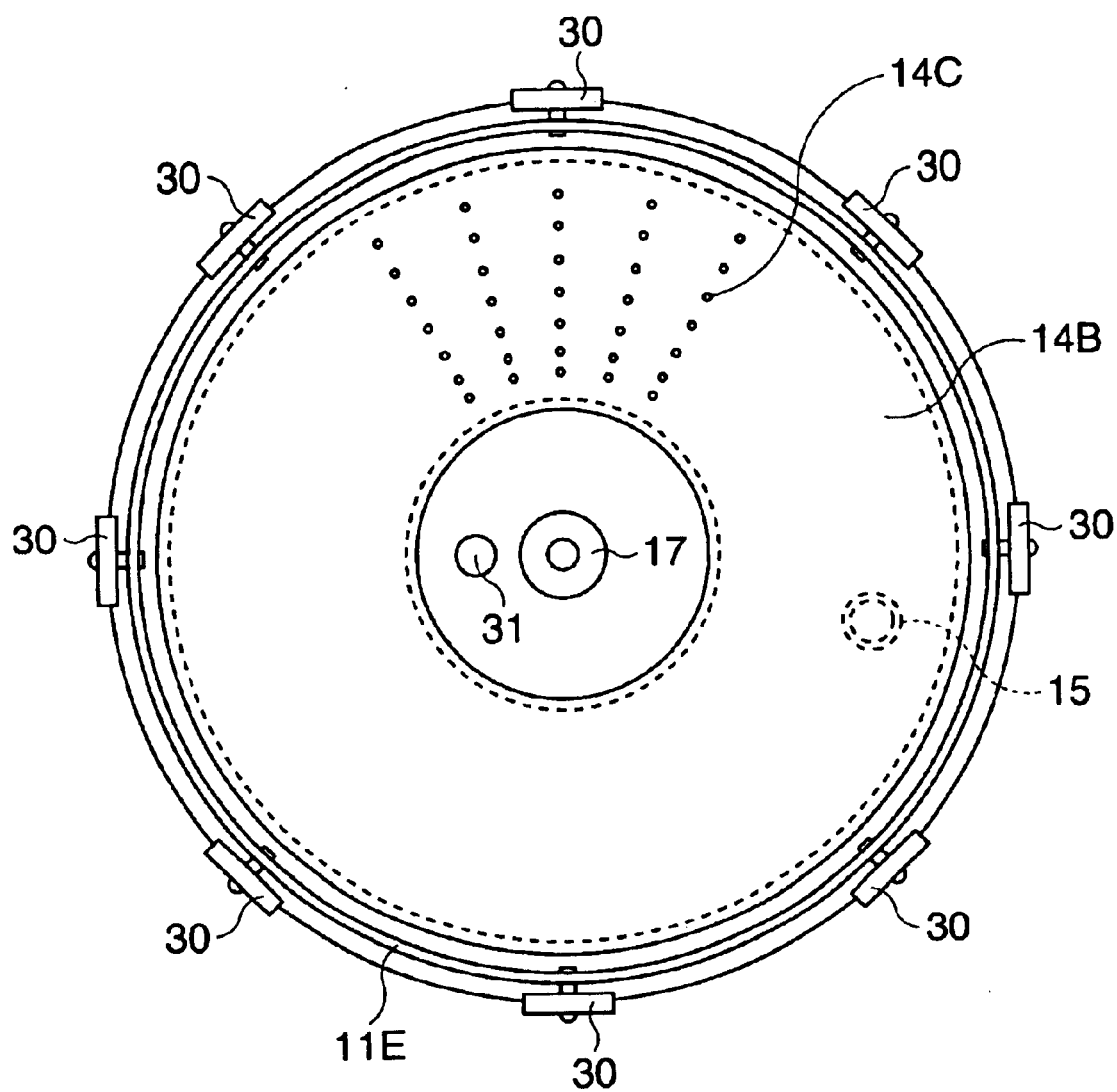
FIG. 9 is a bottom view of the sheet-affixing device illustrated in FIG. 6.

FIG. 6 is a perspective view of the sheet-affixing device of the second embodiment. FIG. 7 through FIG. 9 are a top plan view, a side elevational view, and a bottom view of the sheet-affixing device of FIG. 6, respectively. Note that, the left half part of FIG. 8 indicates the cross sectional view along line X—X of FIG. 7. Further, the suction perforations 14C are only partly depicted.

The constructions of the sheet-affixing device 10' of the second embodiment are similar to those of the sheet-affixing device 10 of the first embodiment except the construction relating to pressing a pressure sensitive adhesive-sheet S against the rim 22 and a way of securing the sheet-affixing device 10' to the wheel 21. Therefore, components which are similar to those in the first embodiment are referred to using the same numerals as those in the first embodiment and the descriptions are omitted.

For the sheet-affixing device 10' of the second embodiment, eight pressing rollers 30, for example, are used in place of the pressing cushion 13. Namely, on the sidewall 11E, which is provided beneath the outer peripheral section 11C along its periphery, the eight pressing rollers 30 are attached at regular intervals. Further, each of the rotational axes of the eight pressing rollers 30 is radially oriented with respect to the outer peripheral section 11C. As in the first embodiment, the pressing rollers 30 are used for pressing and adhering the pressure sensitive adhesive-sheet to the rim 22 of the wheel 21. Therefore, the width of each pressing roller 30 is nearly equal to the width of the rim 22. Further, the lowermost position of each pressing roller 30 and the position of the bottom surface 14B of the absorption plate 14 are distanced by a predetermined distance "d", so that a part of the pressure sensitive adhesive-sheet S, which is absorbed and attached to the bottom surface 14B, is affixed to the wheel 21 before it is attached to the other parts.

The alignment shaft member 17 is connected to the cover member 11 through the supporting member 17A. The supporting member 17A and the cover member 11 are rotatably engaged by using the nut 17B. Namely, the cover member 11 and the pressing rollers 30 of the sheet-affixing device 10' are rotatable about the axis of the supporting member 17A with respect to the absorption plate 14 and the alignment shaft member 17.

Further, a bar member 31 is provided between the air chamber 14A of the absorption plate 14 and the alignment shaft member 17. The bar member 31 is an assistant member to secure the position of the absorption plate 14 when rotating the cover member 11 by handling the handle member 12, and it is arranged in parallel with the alignment shaft member 17. Namely, the bar member 31 is fitted into one of the lug holes (not shown), which are provided around the hub 23 for affixing the wheel 21 to an axle, when the alignment shaft member 17 is fitted into the hub 23 of the wheel 21, so as to restrict the rotational movement of the absorption plate 14.

Next, affixing operations that affix a pressure sensitive adhesive-sheet S to a wheel 21 by using the sheet-affixing device 10' of the present embodiment are explained. At first, the sheet-affixing device 10' is aligned with the wheel 21 by using the alignment shaft member 17 and the bar member 31, and then the bottom surface 14B of the absorption plate 14 comes into contact with the wheel 21. The cushion 16 and the coil spring 18 which are provided between the cover member 11 and the absorption plate 14 are compressed as the handle member 12 is depressed, so that the cover member 11 is moved downward. Thereby, the pressing rollers 30 come in contact with the rim 22 via the pressure sensitive adhesive-sheet S. The handle member 12 is then rotated so as to rotate the cover member 11 and the pressing rollers 30, about the center axis of the alignment shaft member 17. As a result, a peripheral part of the pressure sensitive adhesive-sheet S is sandwiched between the pressing roller 30 and the rim 22, so that the pressure sensitive adhesive-sheet S is affixed to the rim 22. The sheet-affixing device 10' is then lifted, similar to the first embodiment, and the pressure sensitive adhesive-sheet S being adhered to the wheel 21 peels off from the absorption plate 14.

Further, when the sheet-affixing device 10' comprises the bar member 31, as described above, the absorption plate 14 is securely fixed to the wheel 21 by using the bar member 31 and the alignment shaft member 17, so that distortion and wrinkle of the pressure sensitive adhesive-sheet S, which might be produced when rotating the pressing rollers 30, are prevented by disallowing the rotation of the absorption plate 14. Further, since the sheet-affixing device 101 is well secured to the wheel 21, the above rotational operation can be carried out under stable conditions.

Figure 10:
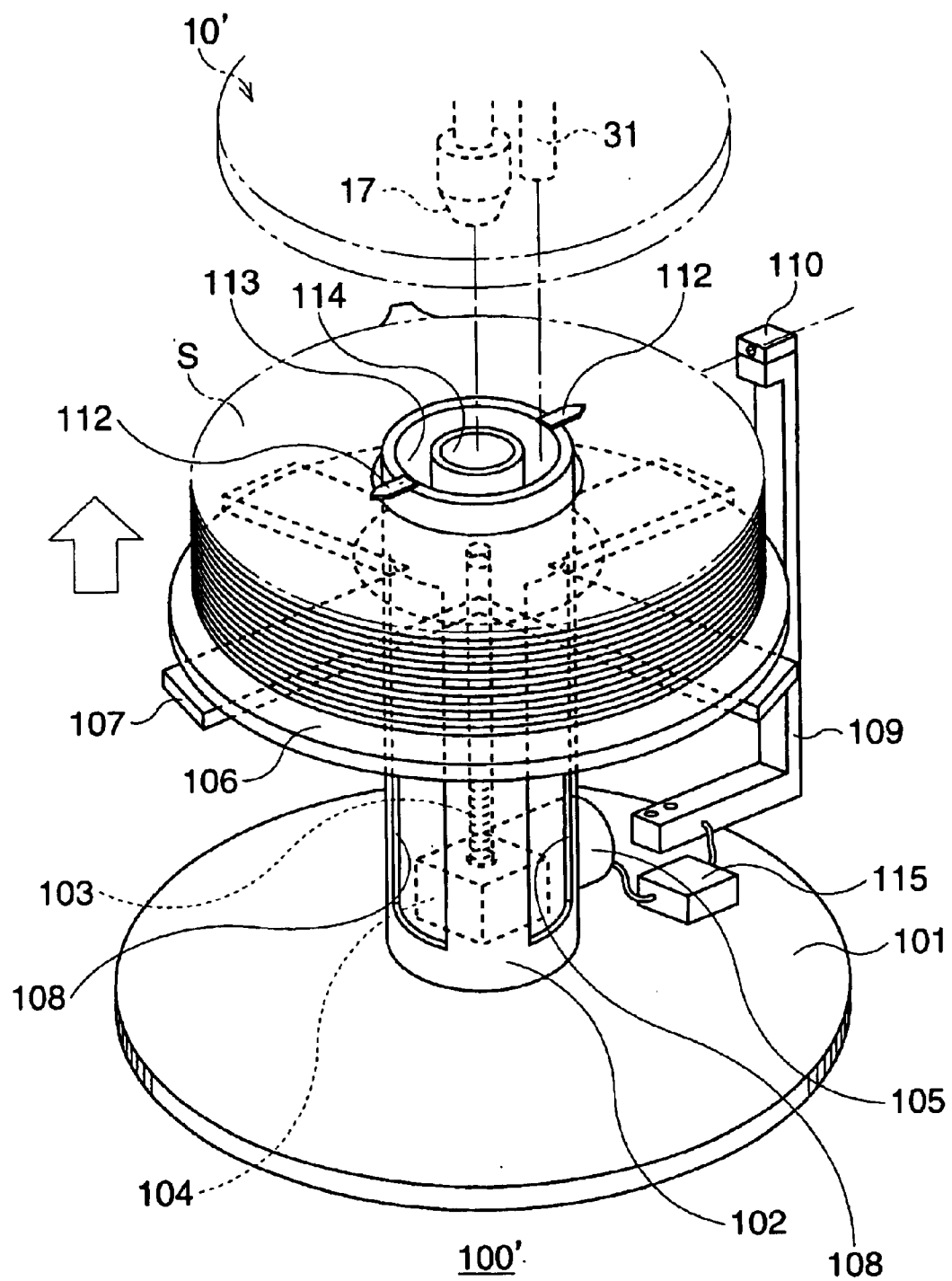
FIG. 10 shows a perspective view of a sheet-supplying device which is used in the second embodiment.

FIG. 10 shows a perspective view of a sheet-supplying device which is used in the second embodiment. Constructions of the sheet-supplying device 100' of the second embodiment are similar to those used in the sheet-supplying device 100 of the first embodiment, so that only the constructions dissimilar from those in the first embodiment will be explained. Further, for those elements that are common to the first embodiment will be referred to using the same numerals.

Since the sheet-affixing device 10' of the second embodiment has the bar member 31 separately from the alignment shaft member 17, the opening formed on the upper end face of the cylindrical supporting member 102 of the sheet-supplying device 100' has a double construction. Namely, there is a cylinder 114 provided inside a cylinder 113 of which the internal diameter is relatively larger than the external diameter of the cylinder 114. The alignment shaft member 17 is inserted into the cylinder 114, while the bar member 31 is inserted into the space between the cylinders 113 and 114.

As described above, according to the second embodiment of the present invention, an effect similar to the first embodiment can be obtained.

Although the embodiments of the present invention have been described herein with reference to the accompanying drawings, obviously many modifications and changes may be made by those skilled in this art without departing from the scope of the invention.

The present disclosure relates to subject matter contained in Japanese patent application No. 2002-230887 (filed on Aug. 8, 2002) which is expressly incorporated herein, by reference, in its entirety.

What is claimed is:

1. A sheet-affixing device for affixing a pressure sensitive adhesive-sheet onto a wheel, comprising:
    an absorption plate member that is formed in a ring-shape with the exterior diameter smaller than the diameter of a rim of said wheel, and of which the bottom surface is provided with a plurality of suction perforations;
    an alignment shaft member that is fitted into the hub of said wheel in order to align the center of said absorption plate member with the center of said wheel; and
    a pressing member that is used for pressing a peripheral part of said pressure sensitive adhesive-sheet, suctioned to said bottom surface, against said rim in order to affix said peripheral part to said rim, and which is movable relative to said absorption plate member along the axial direction of said ring-shaped absorption plate member.

2. A sheet-affixing device according to claim 1, further comprising a cover member to which said pressing member is attached, and a handle member that is attached to said cover member, wherein said absorption plate member is fixed to said alignment shaft member and said alignment shaft member is supported on said cover member and is movable in relation to said cover member.

3. A sheet-affixing device according to claim 2, wherein said pressing member is displaceable from a first position, where said bottom surface of said absorption plate member is in contact with said wheel while said pressing member is distant from said rim, to a second position, where said pressing member comes into contact with said rim, by moving said pressing member in said axial direction by using said handle member.

4. A sheet-affixing device according to claim 1, wherein said pressing member comprises a ring member which is provided outside of said absorption plate member.

5. A sheet-affixing device according to claim 1, wherein said pressing member is rotatable about the axis with respect to said absorption plate member.

6. A sheet-affixing device according to claim 5, wherein said pressing member comprises a plurality of rollers which are provided outside of said absorption plate member, and said rollers are rotatable along said rim when the center of said absorption plate member is aligned with the center of said wheel.

7. A sheet-affixing device according to claim 5, further comprising a bar member that is fitted into a lug hole of said wheel, said lug hole being used to secure said wheel to an axel, wherein said absorption plate member is fixed to said bar member and said alignment shaft member, so that a position of said absorption plate member is fixed with respect to said wheel when said pressing member is rotated.

8. A sheet-supplying device which supplies a pressure sensitive adhesive sheet to the sheet-affixing device that is described in claim 1, said sheet-supplying device comprising:
  a table member where a plurality of ring-shaped pressure sensitive adhesive-sheets is piled up;
  a table elevator that transfers said table member along the axis of said ring-shaped pressure sensitive adhesive-sheet;
  a shaft receiving member that receives an alignment shaft member of said sheet-affixing device so as to align the center of said sheet-affixing device with the center of said ring-shaped pressure sensitive adhesive-sheets which are piled on said table member; and
  a control unit that controls said table elevator in order to keep a position of an uppermost sheet of said pressure sensitive adhesive-sheets, which are piled on said table member, at a predetermined position where said uppermost sheet comes into contact with a bottom surface of an absorption plate member of said sheet-affixing device when alignment of said sheet-affixing device is achieved.

* * * * *